United States Patent [19]
Lucier et al.

[11] Patent Number: 5,373,632
[45] Date of Patent: Dec. 20, 1994

[54] FABRICATING AND MACHINING PROCEDURES FOR CRANKCASES FOR LOCOMOTIVE DIESEL ENGINES

[75] Inventors: Gregory T. Lucier, Boise; Edward C. Allen, Kuna, both of Id.

[73] Assignee: MK Rail Corporation, Boise, Id.

[21] Appl. No.: 165,336

[22] Filed: Dec. 13, 1993

[51] Int. Cl.$^5$ ............................................. B23P 15/00
[52] U.S. Cl. .................................. 29/888.011; 29/888; 29/402.03
[58] Field of Search .............. 29/888.011, 888, 888.01, 29/402.03, 402.19

[56] References Cited

U.S. PATENT DOCUMENTS

| | | | |
|---|---|---|---|
| 4,862,865 | 9/1989 | Dahler et al. | 123/699 |
| 5,222,295 | 6/1993 | Dorris, Jr. | 29/888.011 |

FOREIGN PATENT DOCUMENTS

| | | | |
|---|---|---|---|
| 2680993 | 3/1993 | France | 29/888.011 |
| 1701463 | 12/1991 | U.S.S.R. | 29/888.011 |

*Primary Examiner*—Irene Cuda
*Attorney, Agent, or Firm*—Raymond N. Baker

[57] ABSTRACT

Procedures for machining static crankcase structure, free of motive-drive components, and fabricating in-place preselected thickness gage endplates to provide crankcases for continued use of two-cycle V-type diesel electric locomotive engines. In crankcase refabrication procedures, original endplates are removed and distal edges machined to preserve overall crankcase length within tolerance limits. Externally cut openings in peripheral air box side walls and removal of an upper portion of each endplate provide access to internal framework members for removal of the endplates. Power deck surfaces are machined uniformly and camshaft locations are determined trigonometrically responsive to such downward displacement of the power deck. The new endplates are welded in place, free of drilled or tapped drive component openings. Subsequent machining of the new endplates compensates for any existing vertical or transverse cant of each endplate. Stub shaft support and other openings for endplate support of drive components maintain their same angular and dimensional relationships to the relocated camshafts and crankshaft.

12 Claims, 9 Drawing Sheets

FIG. 1
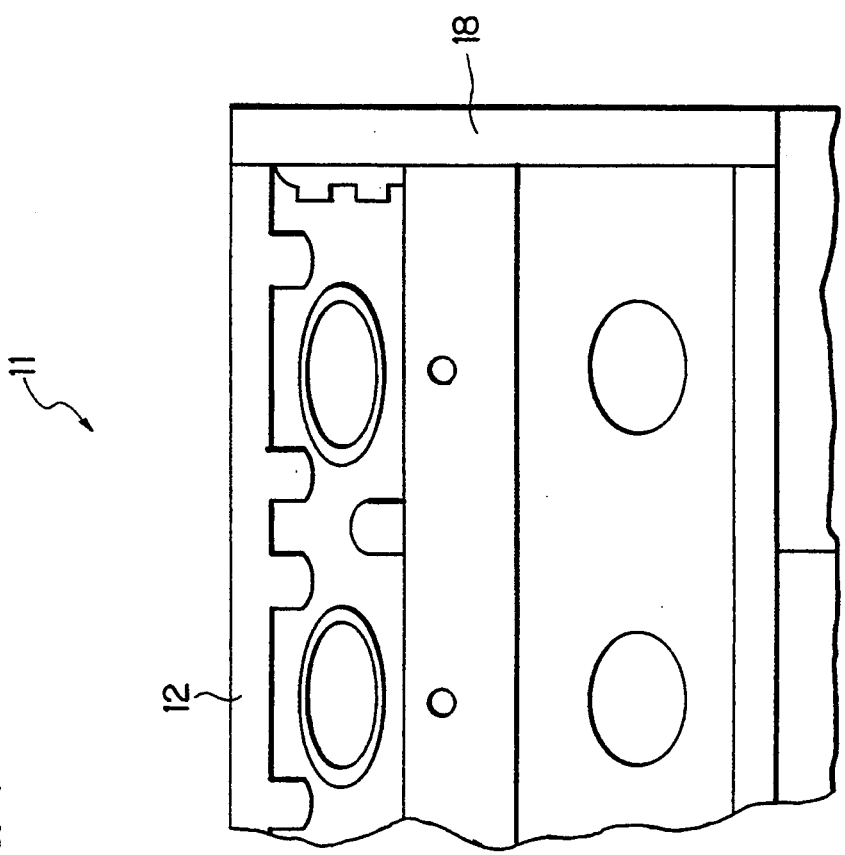
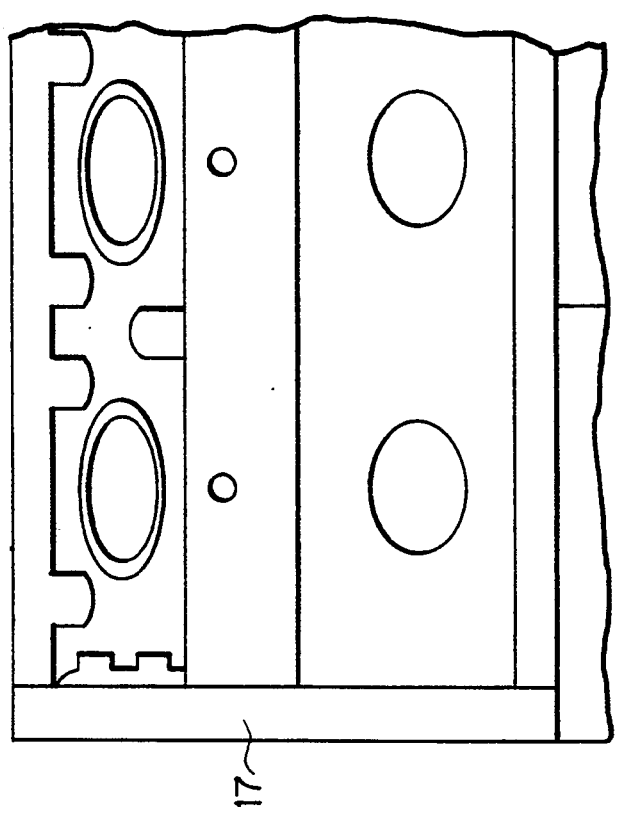

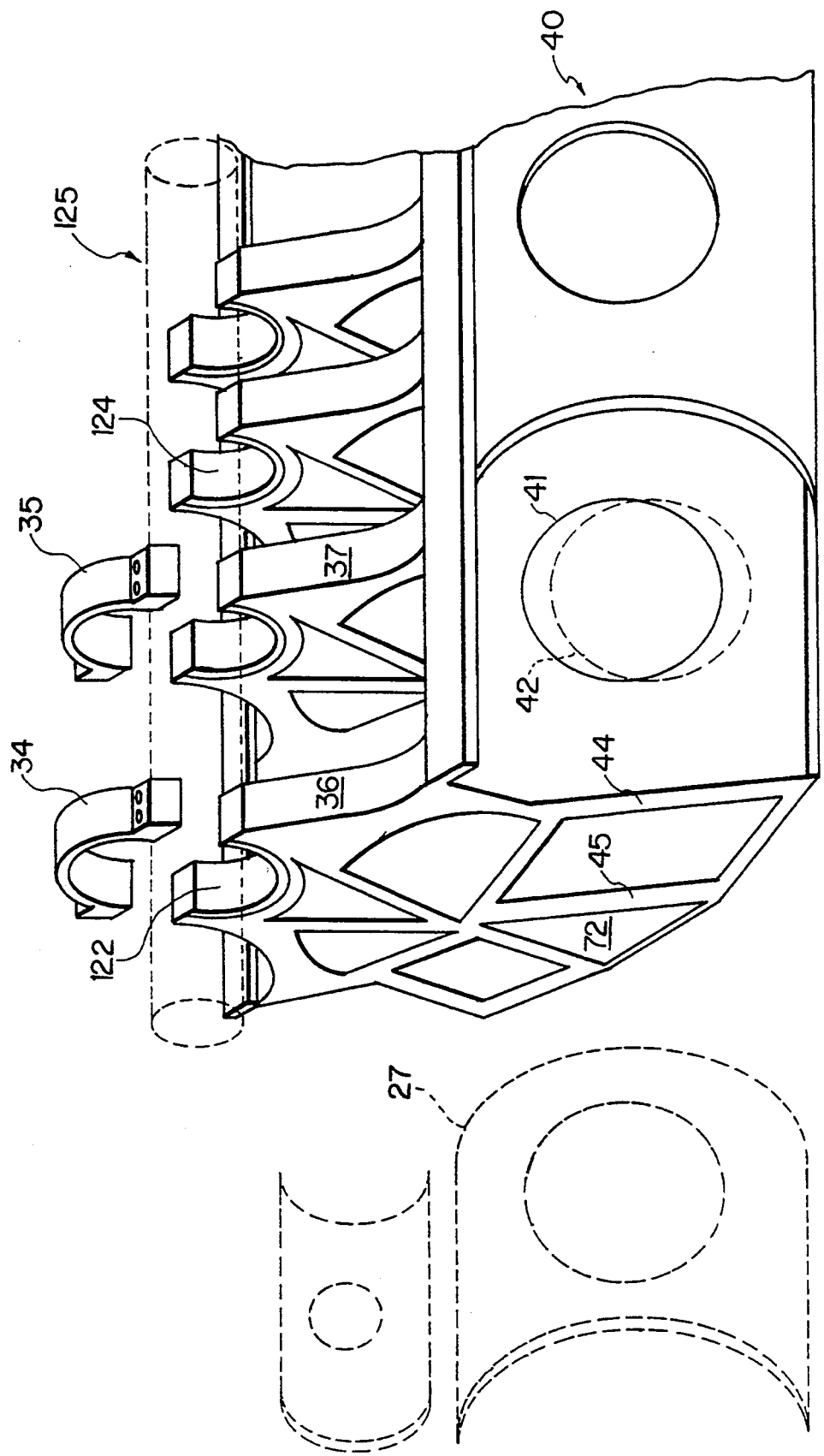

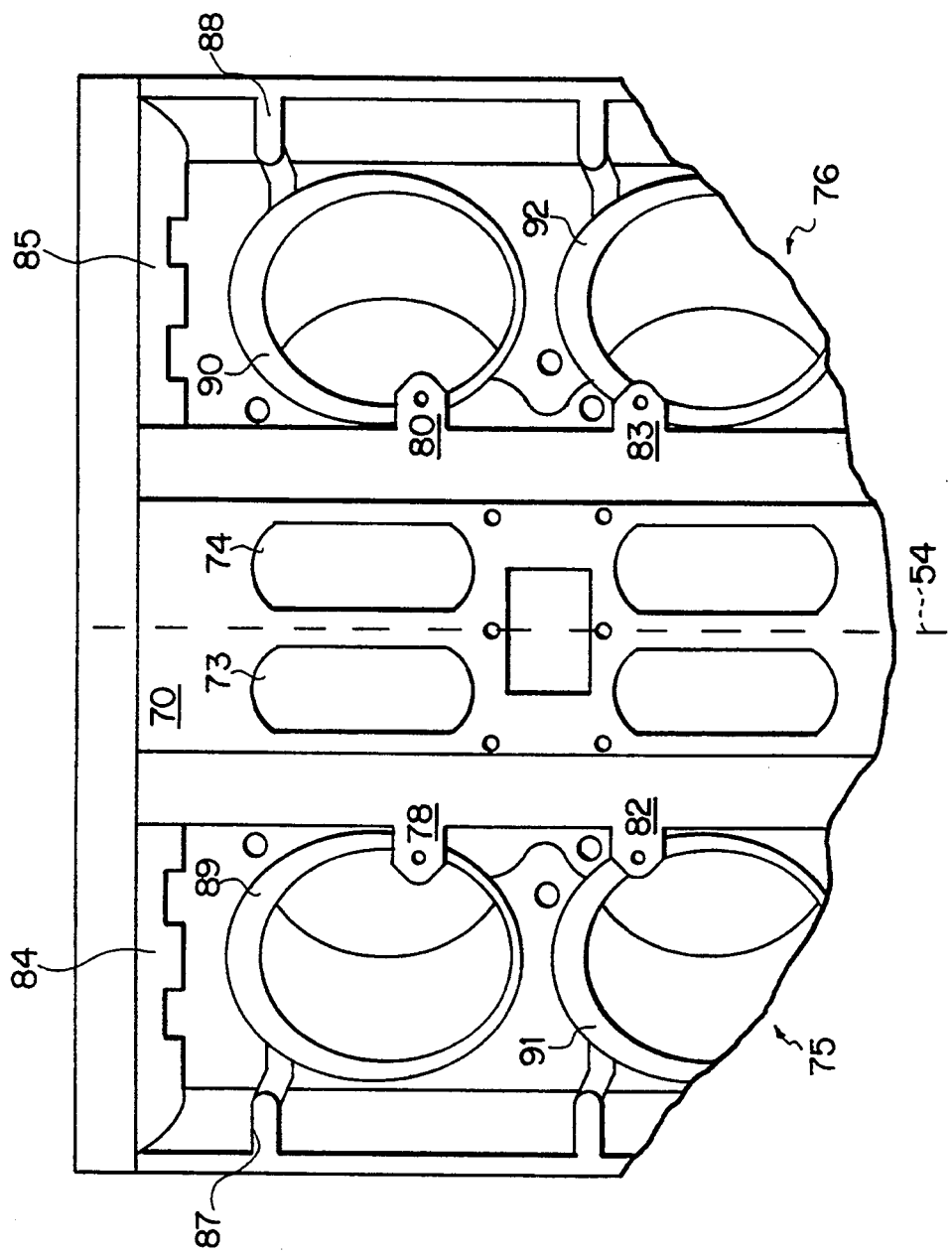

1

FABRICATING AND MACHINING PROCEDURES FOR CRANKCASES FOR LOCOMOTIVE DIESEL ENGINES

This invention relates to two-cycle V-type locomotive diesel engines and, more particularly, is concerned with static crankcase structure and procedures for proper orientation and coacting relationships of crankcase-supported motive-drive components. Specific aspects of the invention involve machining portions of the crankcase and in-place fabricating of preselected thickness gage endplates.

Railroading experience with diesel electric locomotives established the reliability of a two-cycle V-type diesel engine; in particular, a six hundred forty-five cubic inch cylinder engine series introduced in the early nineteen sixties. Production by the original manufacturer of diesel electric locomotives with the latter engine series extended for more than twenty years, but was discontinued in the 1980's.

An objective of the present invention is to extend usage of selected two-cycle V-type diesel engines for locomotive use. The present teachings are directed to processes and procedures for providing static framework crankcases for sixteen-cylinder two-cycle V-type locomotive diesel engines including processes and procedures for restoring to commercial railroading use crankcases which, because of damage or for other reasons, had been withdrawn from commercial usage.

Part of the objective is to sustain use of both engine and locomotive capabilities which have become familiar to enginemen and other railroad personnel responsible for train make-up, for handling and responding to wheel and track adhesion requirements under varying conditions, and for other, like railroading purposes.

Endplates of preselected thickness gage, as taught, augment crankcase support strength for motive-drive components while providing for in-place machining of the exterior surface of each endplate in order to maintain overall crankcase length within tolerance specifications. Machining of V-oriented cylinder bank power deck surfaces is carried out to establish camshaft and crankshaft locations.

The above and other procedures and contributions of the invention are described in more detail with references to the accompanying drawings; in which:

FIG. 1 is a schematic side elevation partial view of a crankcase, free of motive-drive components, as prepared for camshaft and crankcase location procedures;

FIG. 4 is a schematic perspective disassembled view, in inverted position, of a portion of the static crankcase structure remaining after endplate removal and disassembly of replaceable window portions of FIG. 2;

FIG. 6 is a schematic top plan partial view of an upper portion of a crankcase for describing processing steps of the invention relating to exhaust deck and power deck surfaces;

Procedures of the invention are applicable to static crankcase structure, free of motive-drive components, but include machining procedures which control the location of endplate-supported camshaft support brackets and other motive-drive components. To briefly summarize one embodiment, in the side elevation of elongated crankcase 11 of FIG. 1, exhaust deck 12 presents an upper surface for a two-cycle V-type diesel engine crankcase. In angled relation thereto, individual power deck support surfaces, such as 14, 15, 16, shown in one cylinder bank of the V-type crankcase, are machined to define a power deck surface for that bank. Machining those surfaces selectively and uniformly in accordance with present teachings determines camshaft and crankshaft locations such that preselected thickness gage endplates 17, 18 can be drilled to provide openings for proper drive orientation, coordination and support of drive components.

Figure 2:
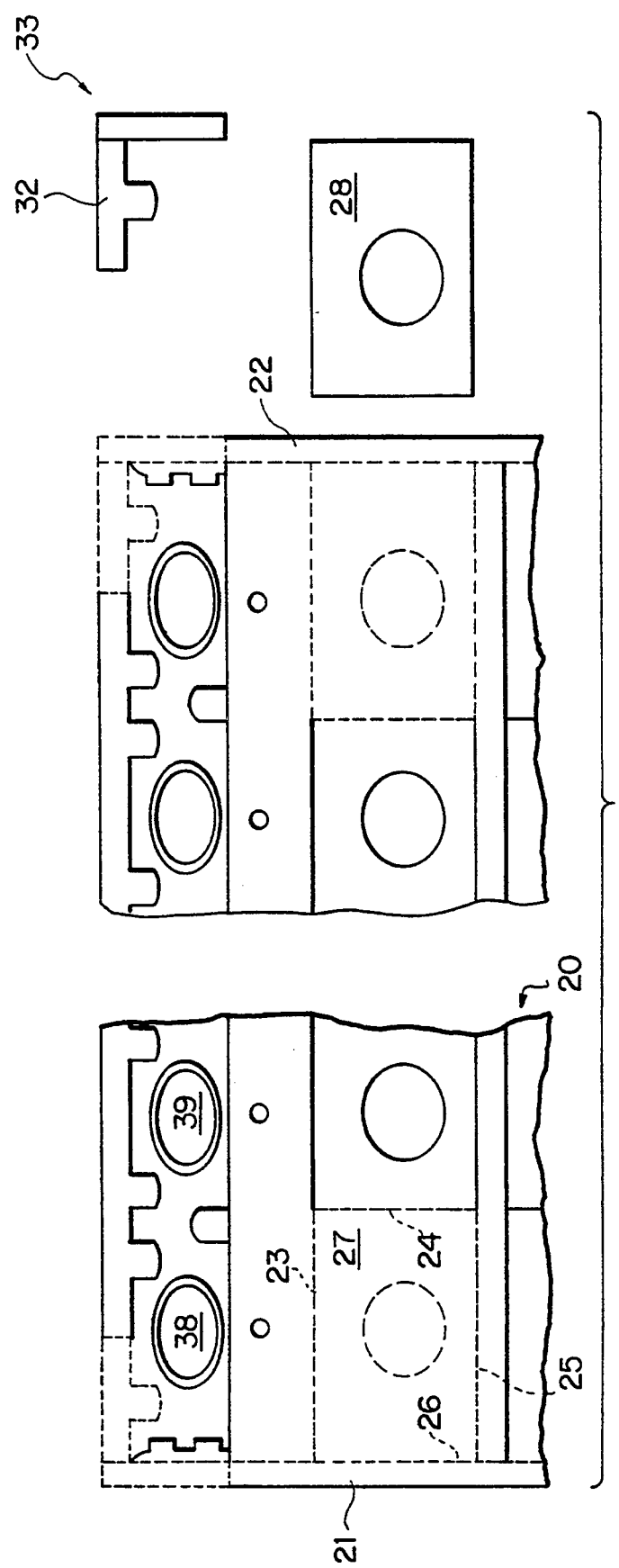
FIG. 2 is a schematic side elevation partial view of a crankcase for describing cutting procedures for replacement of endplates in accordance with the invention.

In the specific embodiment of FIG. 2, all drive-related components, including fluid (air, lube oil, exhaust and cooling water) pump and bracket support means, have been removed in preparation for restoration of a pre-used crankcase 20. Present teachings provide for removal of endplate 21, 22 from each respective longitudinal end of the elongated unitary crankcase to enable replacement with a preselected thickness gage endplate. The invention is described in relation to crankcases for two-cycle V-type, six hundred forty-five cubic inch cylinder (Series 645) diesel electric locomotive engines.

In carrying out the invention, endplates 21, 22 are removed by transversely-directed submerged arc or otherwise oxygen-enhanced flame-type cutting along the crankcase peripheral side wall and along internal framework members contiguous to each longitudinal end of the elongated V-type engine. A significant contribution involves providing openings to augment interior access which are cut from externally of crankcase 20 at and near its longitudinal ends. Peripheral side walls of the crankcase are cut along interrupted lines (23, 24, 25, 26 of FIG. 2) for disassembly of a replaceable access window 27; similar cuts provide for disassembly of access window 28 at the opposite longitudinal end of crankcase 20; and window access portions are cut at the same locations in side wall means for the remaining bank of cylinders.

Figure 3:
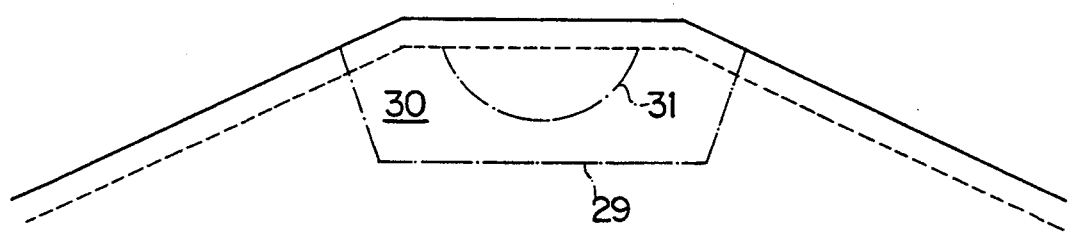
FIG. 3 is a schematic end elevation view of an upper portion of the crankcase of FIG. 2 for describing crankcase access procedures.

Referring to FIG. 3, cutting the in-place endplate along interrupted line 29 provides for separation of an upper portion 30 of each endplate. That type of endplate cut is provided in order to overcome difficulties of internal access due to the location of a water galley half-round flow diverter 31; other cross cuts are made in the water discharge manifold adjacent to the end pair of cylinders at each longitudinal end of the crankcase. A portion 32 of the exhaust deck and its associated structure (FIG. 2), and the upper endplate portion 30 (as shown in FIG. 3) are removed. Upper exhaust deck and associated structure 32 will be separated from endplate segment 30 and return welded into place contiguous to the end pair of cylinders.

Transversely-directed cutting of crankcase framework members for endplate removal is carried out in a manner to limit shortening of the remaining static structural framework which is important to maintaining overall crankcase length within acceptable tolerance limits. Separation of peripheral access portions, such as air box window portions 27, 28, facilitates achieving the desired type of transversely-directed severance at interior framework locations using oxygen-arc, flame or other type of oxygen-assisted cutting.

Removal of motive-drive components in order to prepare crankcase 20 for refabrication includes removal of crankshaft retainer caps, of the type shown at 34, 35 in FIG. 4, which coact with the main "A" frame supports such as 36, 37. All segments of the crankshaft, and of each camshaft, are removed along with each camshaft support endplate bracket and other endplate support drive assemblies and brackets. Also, the camshaft bearing towers located along the power deck of each bank are removed as are the bearing blocks for the fuel injector drive shaft for each bank; and pumping and other appurtenances associated with supply of air, lube oil and coolant water to an engine and for removal of the exhaust after passing through water jacket exhaust passages are removed. More detailed information on motive-drive components is available from the 645 E3 *Turbocharged Engine Maintenance Manual*, 8th Ed. (1983), a Service Department publication of the Electro-Motive Division of General Motors, La Grange, Ill. 60525; in particular, pages 2-19, 21; 3-2, 8, 13-16; and 4-1, 3 which are incorporated herein by reference.

Limited access to the crankcase interior for some purposes is available by demounting the crankcase from the oil pan and removal of all drive-related components. For example, removal of the cylinder liner/power assemblies provides localized access through cylinder retainer structures, such as 38, 39, of the remaining framework structure 40 (as partially shown in FIGS. 4, 5). However, removal of replaceable peripheral air box windows (as shown in FIGS. 2, 4) enables access to centrally located portions of an endplate for the transversely-directed flame or arc cutting of interest; for example, more direct access through openings, such as 41, 42, of FIG. 4, through interior crankcase framework members 44, 45 is available. The replaceable window portions which are removed from each side wall at each longitudinal end of crankcase 20 also augment interior access for later replacement welding of a new preselected thickness gage endplate to longitudinal structural framework edges at each end of the crankcase.

Endplates 21, 22 of crankcase 20 to be refabricated have a thickness of about three-quarters of an inch. In accordance with the invention, such endplates are replaced with heavier-gage planar endplates having a thickness of about one inch to about one and one-quarter inches. A thickness gage of about one and one-eighth inches is selected for the specific sixteen-cylinder embodiment as sufficient to provide for processing steps involving transversely-directed cutting of framework members and the multiple machinings, as described later, both for alignment of drive gear assemblies and in order to maintain a preselected length for the replacement crankcase which is within tolerance limits for the specific elongated two-cycle V-type diesel engine for locomotive use.

Figure 5:
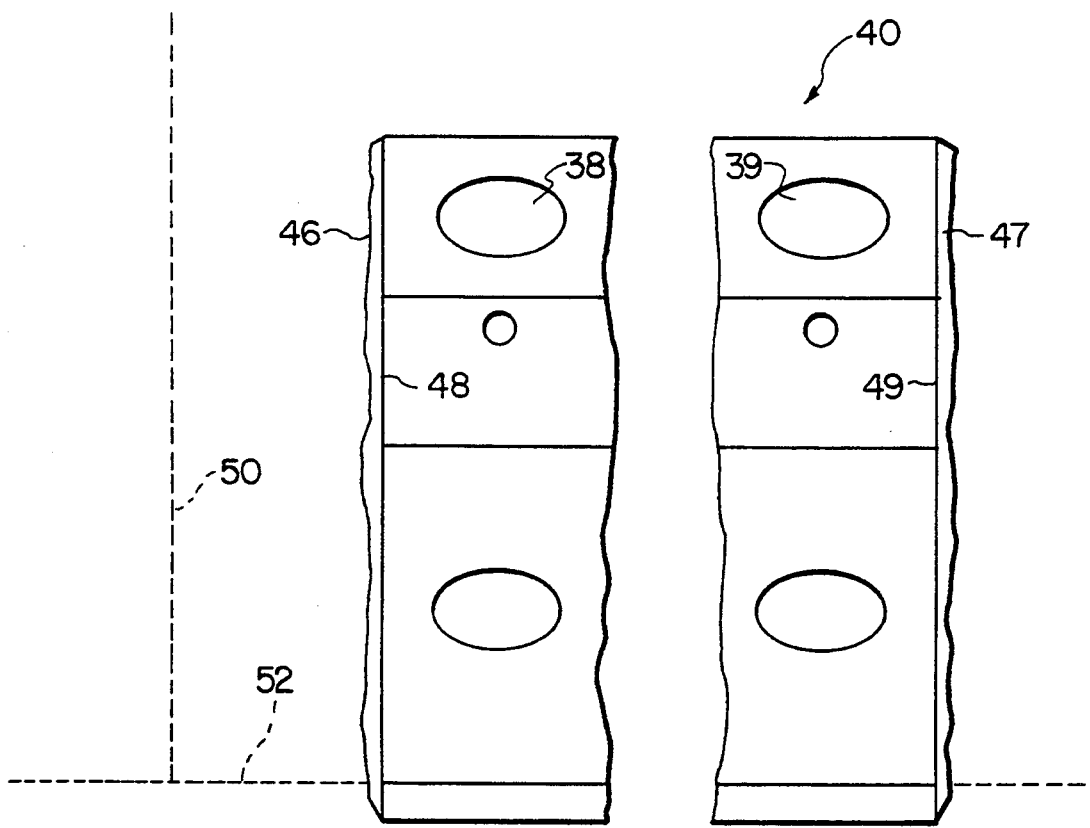
FIG. 5 is a schematic side elevation partial view for describing machining purposes of the invention for longitudinal distal ends of the remaining framework after removal of crankcase endplates.

Cutting to remove endplates 21, 22 produces rough longitudinal edges on remaining static structural framework 40, as schematically indicated at 46, 47 of FIG. 5. After removing burrs, rough edges 46, 47 are machined to provide planar surfaces, indicated in cross-section by lines 48, 49, respectively. Such planar surfaces are machined within a tolerance range of about one half to one degree in vertical and transverse directions in relation to vertical transverse reference plane 50 (shown in interrupted lines).

Machining such edges to define a substantially planar surface at each distal end provides a base for solidly receiving a new planar endplate. The objective is to facilitate the desired type of welding to make each endplate unitary with the remaining framework throughout the crankcase cross section at each longitudinal end. Each new endplate of preselected thickness gage can be used to compensate for slight camber, if any, in a crankcase. Subsequent machining of the external surface of each new endplate compensates for any vertical or transverse cant of machined edge surface plane 46 or 47 with respect to transverse reference plane 50. Such subsequent machining also provides for achieving drive gear alignment, parallel with external endplate surfaces, within overall crankcase length tolerance limits.

Centrally-located horizontal reference axis 52 (FIG. 5), which extends longitudinally of the crankcase, is perpendicularly transverse to reference plane 50. A centrally-located longitudinally-oriented vertical reference plane 54 (shown in FIGS. 6, 7, 8) extends between the longitudinal distal ends of the structure, includes such centrally-located horizontal reference axis 52, and is perpendicularly transverse to reference plane 50. And the severed length of a sixteen-cylinder six forty-five series crankcase is one hundred forty-six inches plus or minus fifty mils.

Each new endplate is welded in place, free of drilled or tapped openings. The increased-thickness gage endplates maintain or augment support for engine-mounted drive components, and provide for external endplate surface machining while maintaining such preselected overall length within tolerance limits.

The exhaust deck 70 (FIG. 6) is evaluated prior to refabrication. It has been determined that, for service and required support purposes, a minimum thickness should be provided along the exhaust deck 70 of the water discharge manifold 72 of FIG. 4. The exhaust passages from each cylinder establish exhaust openings, such as 73, 74, of FIG. 6, in the exhaust deck 70. Exhaust deck prerequisites for water jacket strength and durability require taking into account machining of the upper surface to provide the desired smooth horizontal surface for seating water discharge and exhaust outlet gaskets, and the need to help to support superstructure of an assembled engine. Exhaust deck thickness, after machining, is selected in the range of from five eighths to about seven eighths inch along its length for the specific embodiment.

The upper surface of exhaust deck 70 is machined (while avoiding diminishing exhaust deck thickness to less than five eighths inch) in a plane which is transversely perpendicular to the central longitudinally-oriented reference plane 54. Power deck machining is coordinated with the power deck surface of each cylinder bank (75, 76 of FIG. 6) and in an amount substantially in excess of the exhaust deck machining. A single planar surface is machined for each power deck with uniformity. That is, if such planar surfaces were extended laterally inwardly, each would intercept the central reference plane 54 along the same line above the exhaust deck 70 and, in the specific embodiment, each would form an included angle of sixty-seven and one-half degrees with plane 54.

A plurality of individual support surfaces are relied on for purposes of defining a single planar surface for each power deck. In the specific embodiment, individual cam tower support surfaces, such as 78, 80, 82 and 83 (FIG. 6), are located adjacent to each side of exhaust deck 70. Crab-bolt support surfaces, such as 84, 85, are located at each longitudinal end and centrally of each cylinder bank. And bearing block surfaces, such as 87, 88, are located along the outer periphery of each respective bank for support of a fuel injection control shaft. Such support surfaces are machined to define a single plane power deck surface for each bank.

Upper surfaces, such as 89, 90, 91, 92, of cylinder head retainers (shown in FIG. 6) are located at a level below the power deck surface for each bank and are machined only to the extent necessary to provide a smooth surface for receiving a cylinder head seal. Associated cylinder support structure locations, with each retainer, include an internal air box surface for receiving studs for providing for cylinder head retainers.

Power deck surfaces which are machined along each respective bank define a single planar surface in each bank extending longitudinally alongside, and in angled relationship with, exhaust deck 70. Each power deck is uniformly angled by such planar surface machining. Each such power deck surface for each bank, as machined, is transversely perpendicular to a plane defined by the central axis of the cylinders in its respective bank; and the angled orientation of each such power deck surface, if extended as previously set forth, intersects the longitudinally-oriented centrally located vertical reference plane 54 along the same horizontal line, and at the same included angle.

Machining for purposes of relocating each power deck and camshaft during refabrication of a crankcase is carried out within defined limits of up to about thirty-five mils for each bank. Downward displacement of the power deck surface is limited in a like amount along the described cylinder central axis of each bank. The machining and such displacement are carried out uniformly in each bank; relocation of the camshaft axis for each bank is responsive to the amount of such machining; and the vertical location for each camshaft axis is moved downwardly in its respective vertical camshaft axis plane by the downward displacement of the power deck surface. The amount of camshaft vertical displacement is determined by triangulation teachings of the invention.

Figure 7:
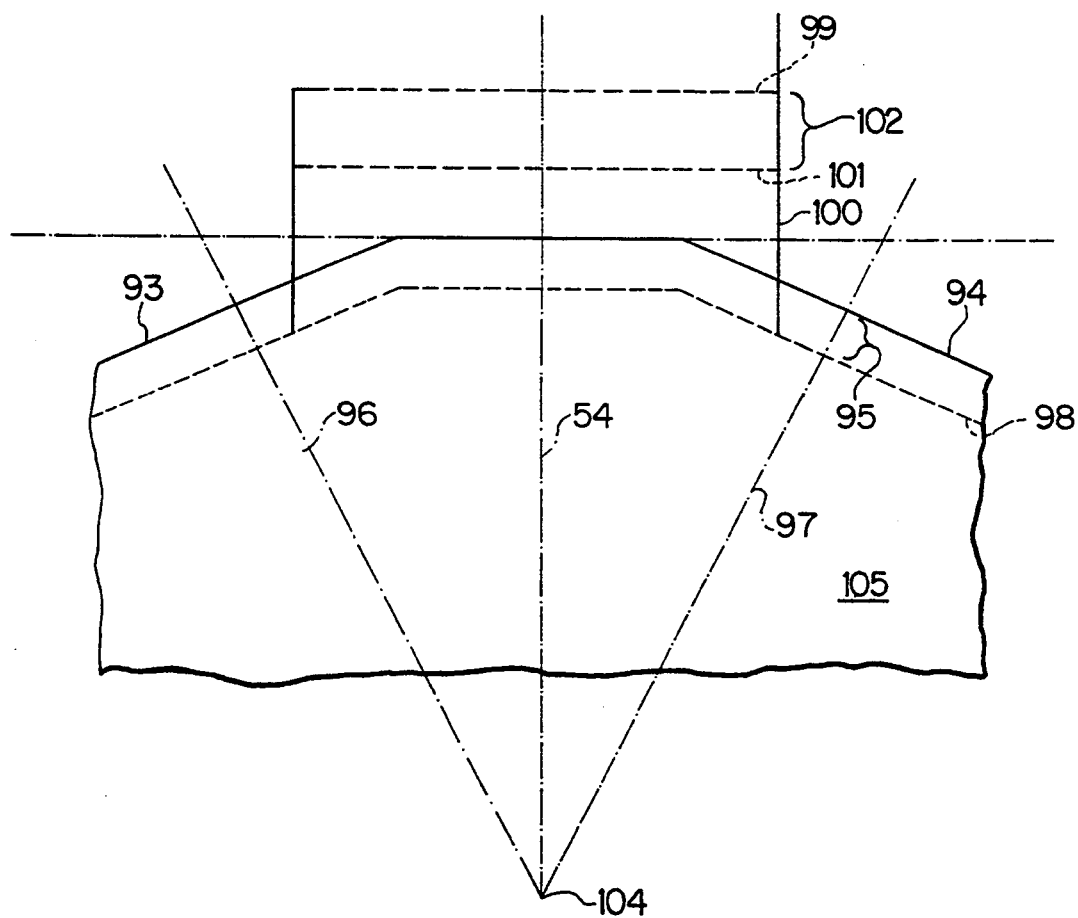
FIG. 7 is a schematic and elevation partial view of a crankcase for describing the dimensional and angular relationships relating to location of the camshafts and crankshaft as a result of machining exhaust and power deck surfaces of FIG. 6.
Figure 8:
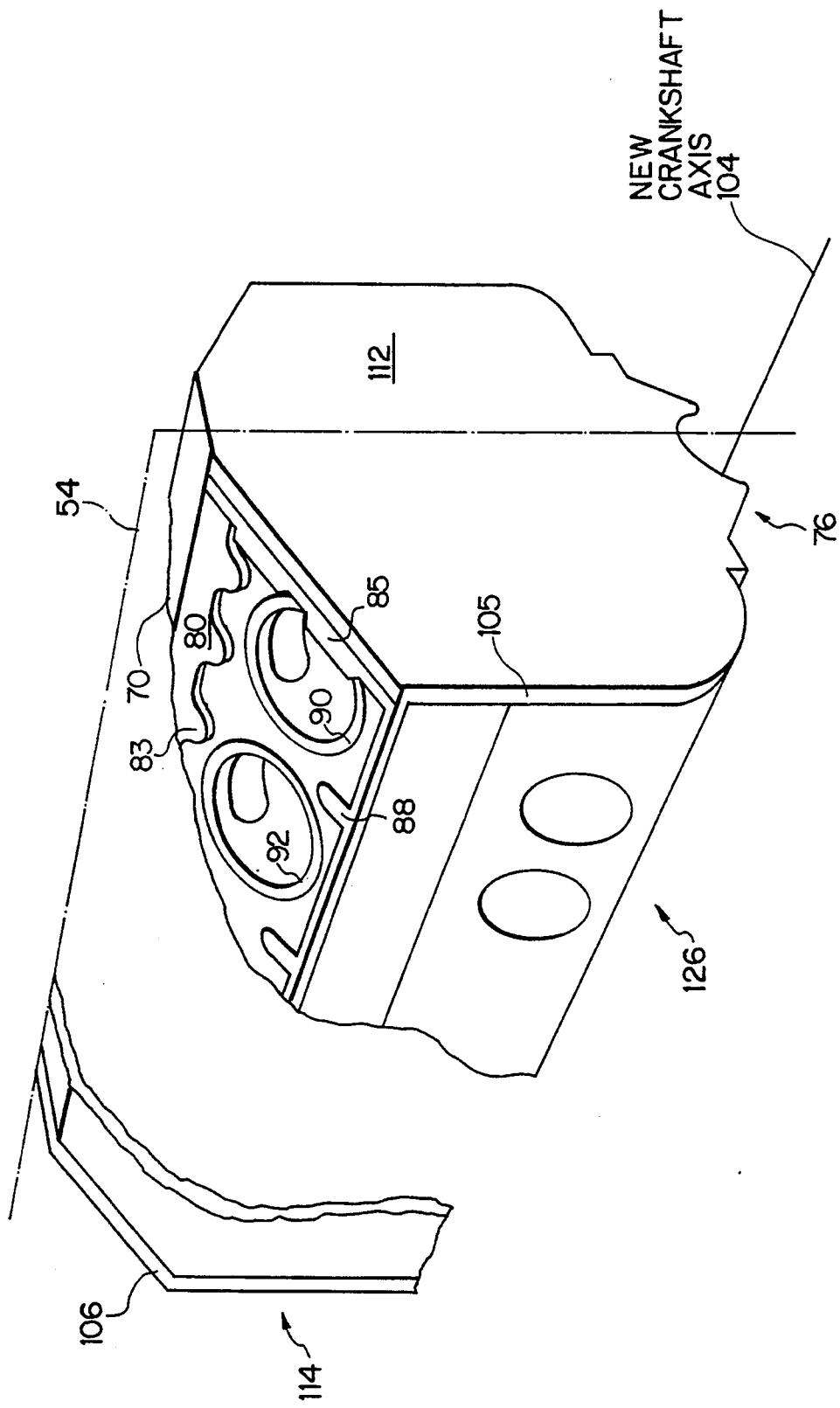
FIG. 8 is a perspective partial view of a crankcase with portions cut away for describing structural relationship and alignment contributions of the invention.

In FIG. 7, each power deck surface 93, 94 is displaced downwardly a preselected amount, as indicated at 95 in the right hand bank of FIG. 7, along cylinder axis 97. Machining of the support surfaces of the right hand bank establishes single planar power deck surface 98 in that bank.

The effect of the downward displacement indicated at 95 is to relocate the camshaft axis 99, along its camshaft vertical plane 100, to new location 101. The amount of vertical displacement 102 of the camshaft axis is calculated trigonometrically based on the machined displacement (95) of the power deck and the twenty-two and one half degree included angle as defined by the V-configuration of the cylinder banks; that is, for the forty-five degree orientation of the cylinder bank of the specific embodiment, the included angle at the intersection of the cylinder central axis (97) with central reference plane 54, at the closed end of the V-configuration, is twenty-two and one-half degrees. Machining displacement, as necessary, is preferably held to about thirty mils. A thirty mils machining displacement of the power deck surface results in about a thirty-two and five tenths mils vertically downward displacement of the camshaft axis in vertical plane 100; a twenty mils machining displacement in the power deck results in a vertical dimension displacement of about twenty-two mils for the camshaft axis.

The machining displacement of each power deck plane is uniform along each respective cylinder axis. The intersection of each cylinder central axis plane for each bank (axes 96, 97 shown in broken lines in FIG. 7) occurs at the same location 104. The vertical displacement of the camshaft axis, indicated at 102, also verifies the new crankshaft axis location at 104, since the crankshaft vertical displacement along the central vertical reference plane 54 is the same as vertical displacement 102 for a camshaft axis along its vertical plane 100. Those same dimensional relationships exist between the crankshaft and the camshaft relocation in the remaining bank of the V-configuration engine.

The effect of such coordinated relocations of the crankshaft and camshafts on other drive components is integrated by the new endplates (such as 105 FIGS. 7, 8) By the above described procedures, the angular and dimensional relationships between the relocated crankshaft axis and each relocated camshaft axis are maintained the same. Each of the new openings to be drilled or tapped for stub shaft brackets, camshaft brackets, and all appurtenances in each new endplate, is located with the same relative angled relationship and dimensional spacing with respect to the relocated crankshaft and a relocated camshaft axis. The above-described procedures, and the results of those procedures, provide for use of dimensionally and operationally standard drive components.

The new increased-thickness gage endplates 105, 106 (FIG. 8) are welded in place, as mentioned, free of such drilled or tapped openings for engine-mounted drive gears, camshaft support brackets, stub shaft support brackets, drive assemblies for pumps, and the like. The preselected increased-thickness endplates will sustain longitudinal strength and transverse support while compensating for shortening of the static structural framework due to cutting separation and framework edge machining. Maintaining the crankcase within preselected length tolerance specifications enables interchangeable use of standard length camshaft segments and standard crankshaft segment lengths in addition to maintaining assembly and drive relationships in a locomotive; such crankshaft and camshaft segments are described in more detail, along with other motive-drive components for the six forty-five series engine, in *The Car and Locomotive Cyclopedia of American Practices*, 5th Ed. 1984, Simmons-Boardman Book, Inc., Omaha, Neb. 68102, at pages 640–652, which is incorporated herein by reference.

As crankcase portions and the endplates are welded to be unitary with the crankcase structure, vibration stress-relief is carried out on each weld and its contiguous area.

Vibration stress-relief, to relieve subsurface stresses due to cooling of the welds, is carried out at or near ultrasonic frequency. And, subsequently, the entire replacement crankcase is stress-relieved by thermal treatment. Stress-relief steps are preferably carried out before exterior surface machining and before drill tapping such new endplates. As interior welding at the various framework locations for the new endplates 105, 106 is completed and interior placement of conduits (for lube, air, or cooling fluids, as supplied through endplates or pressurized by endplate mounted drives) is completed, vibration stress-relief is used on the welds and on contiguous areas to decrease subsurface stress.

Such preliminary vibration stress-relief treatment is, preferably, augmented by heat-treatment of the entire crankcase. Such heat-treatment stress-relief can be followed by an added vibration stress-relief of accessible weld areas. Combining vibration and thermal stress-relief treatments substantially eliminates work stresses in the structural framework resulting from welding and are carried out prior to placing the crankcase is use in an engine.

The thermal stress-relief treatment can be selected depending on the work which has taken place during refabrication. In preferred processing, the crankcase is gradually heated, e.g., as the confined heat-treatment furnace is being heated to about 1100° F. to 1200° F.; that temperature is then held for about four hours; and, then, furnace-cooling of the structure is carried out over an extended period of about six hours. Heat-treatment for stress-relief is at least partially time-dependent so that heat soaking and cooling down times can be decreased or increased dependent on the circumstances such as the amount of work stress; the heat-treatment atmosphere can be controlled to be non-oxidizing.

After stress-relief, external surfaces of the new endplates are machined to be parallel to transverse plane 50. The increased-thickness gage for the new endplates enables an exterior surface, or surfaces, to be machined as required for proper alignment of bracket supports for gears at the main and accessory ends of the crankcase such that the plane of rotation of the engine-mounted gears is parallel to the machined external surface of its respective endplate.

After verifying locations of the camshafts and crankshaft, the desired orientation and dimensional relationships for endplate-supported components, in relation to the pair of camshaft axes and the crankshaft axis as described above, can be carried out by template marking of each endplate that endplate boring can proceed.

The openings formed in the endplates for support brackets, and the like, are in parallel relationship to each other and in parallel relationship to the central horizontal longitudinally-oriented reference axis 52. Each such opening is also oriented to be in perpendicularly-transverse relationship to the vertically-oriented transverse reference plane 50. Each such opening, which is related in any way to camshaft and crankshaft locations, is relocated; but, as stated, maintains the same angular and dimensional relationship to the new locations for the camshafts and crankshaft.

The crankshaft bearing surfaces 122, 124 (FIG. 4) of the main "A" frames 36, 37 are augmented by welding of bearing metal in place. Such build-up of bearing metal is coordinated with the above-described vertically downward displacement of the crankshaft; and, also, with placement of the crankshaft retainer (bearing) caps (34, 35) to permit line-boring of the bearing surfaces for uniform coaxial support of crankshaft 125 along its new centerline axis (104 of FIG. 8) by such new bearing surfaces and the bearing caps.

The ends of the legs of the crankshaft retainer caps, such as 34, 35, are machined in combination with the main "A" frame bearings to provide desired uniform coaxial support for the crankshaft around its full perimeter. After the retainer caps 34, 35 are joined to the main bearing "A" frames (which have added bearing metal), longitudinal line-boring operations are used to establish uniform peripheral bearing support in coaxial relation to the new crankshaft centerline axis 104. Main crankshaft and connector rod bearing apertures for movement of lubricating oil are verified to maintain pressurized lube oil bearing surfaces during engine use.

Figure 10:
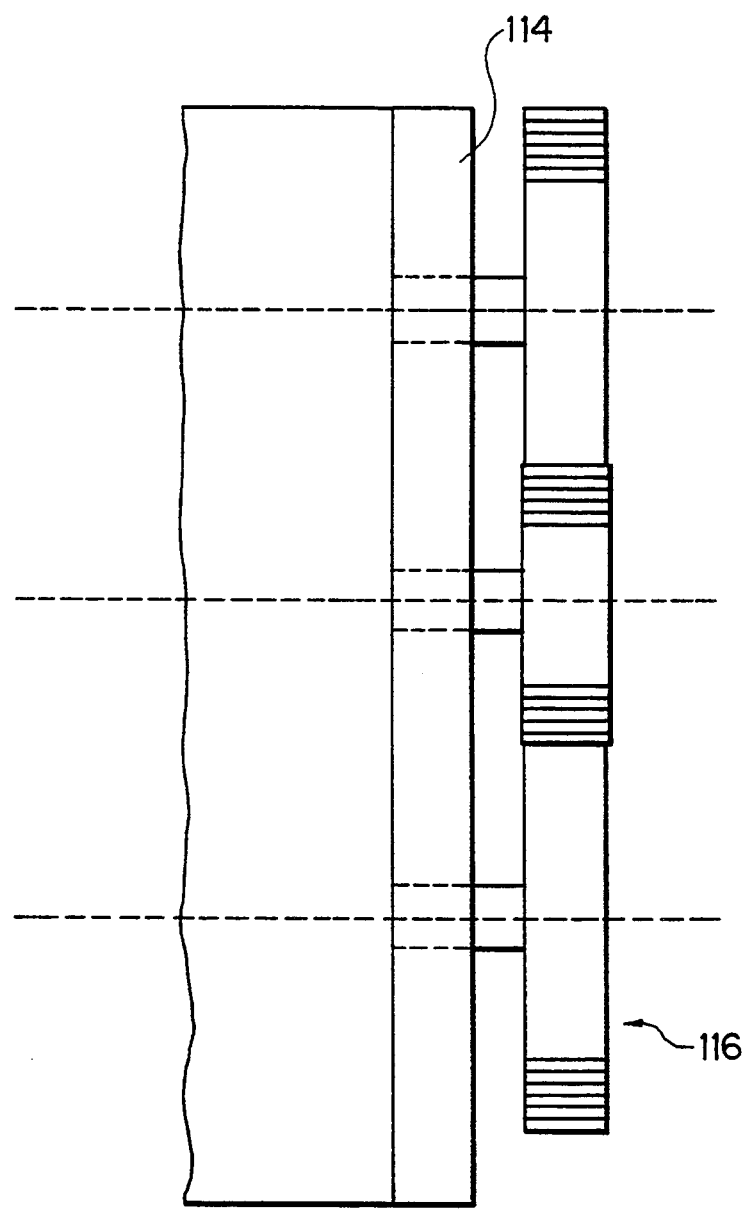
FIG. 10 is a schematic side elevation partial view of a crankcase for describing exterior endplate surface machining for drive gear alignment in accordance with the invention.

In conjunction with cutting separation of endplates 21, 22, machining cut edges 46, 47, and machining exterior surfaces of new endplates 105, 106, the overall length of the replacement crankcase 126 (FIG. 8) is established and verified to be within prescribed overall length tolerance limits. Integrating the effect of relocations of camshafts and crankshaft in relation to drive components and support brackets on the new endplates enables use of standard length crankshaft and camshaft segments, as well as permitting dimensionally standard power assembly components to be properly oriented for functioning in the replacement crankcase. Machining endplate exterior surfaces to be perpendicularly transverse to the horizontal centerline reference axis 52 assures that the plane of rotation for camshaft/crankcase gear train assemblies is parallel to its main drive exterior endplate surface and that the ancillary gear train assemblies are parallel to the ancillary drive exterior endplate surface (FIG. 10). Proper meshing of the gear assemblies is thus provided for successful operation of the engine-mounted main drive components and accessory drive components.

Figure 9:
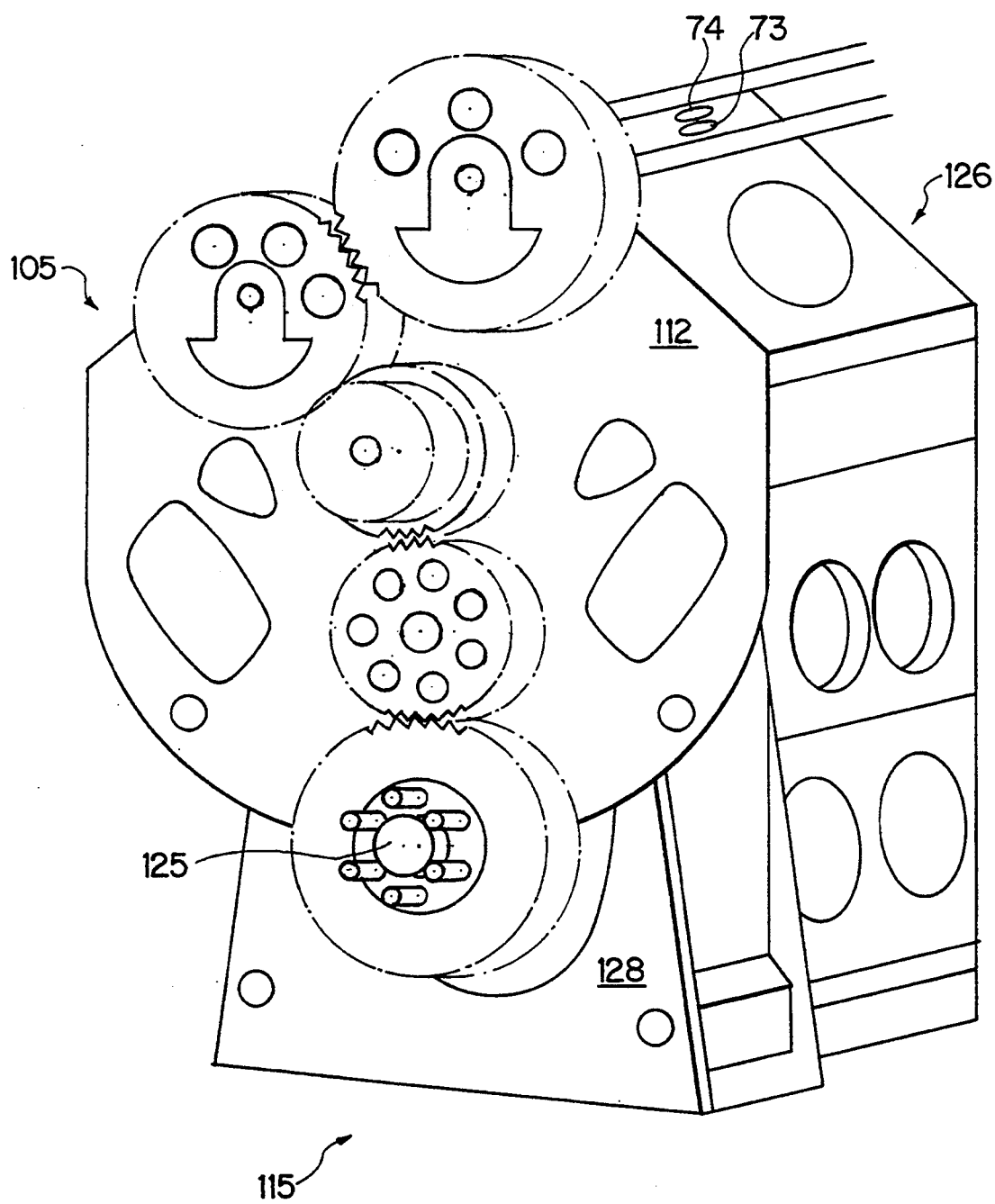
FIG. 9 is a schematic perspective partial view of a crankcase for describing relocations of camshafts and crankshaft by the invention.

The fabricating-machining steps and procedures as described enable interchangeability of standard power assemblies, standard crankshaft segments and camshaft segments, and other standard motive-power assemblies to be mounted for proper orientation and coacting relationships on the replacement crankcase. A refabricated crankcase is, preferably, mounted on the same oil pan 128 (FIG. 9) from which the damaged or otherwise non-used crankcase was removed. As part of accomplishing the objectives of the invention, it should be recognized that successful crankcase replacement, as taught herein, or by conversion as taught in assignee's copending application entitled CYLINDER CONVERSION FABRICATION OF CRANKCASES FOR TWO-CYCLE V-TYPE LOCOMOTIVE DIESEL ENGINES, Ser. No. , 08/165414, filed concurrently herewith, comprises a significant contribution to successful engine replacement and continued use of engines and locomotives of known characteristics.

While specific materials, parts, dimensions and sizes have been set forth for purposes of describing principles of the invention, it should be recognized that certain changes or substitutions can be made in light of the above teachings without departing from those principles. Therefore, reference should be made to the appended claims for purposes of evaluating the scope of the present invention.

We claim:

1. Method for machining crankcase structure for a two-cycle V-type diesel electric locomotive engine to relocate camshaft and crankshaft axes while providing for proper orientation of engine-supported motive-drive components, comprising the steps of:

A. providing an elongated crankcase for a two-cycle V-type diesel locomotive engine free of all motive-drive associated components and all handhole covers;

such elongated crankcase being unitary and presenting:

(i) a pair of V-oriented cylinder banks, each bank extending longitudinally along its respective left and right side of the elongated crankcase, with each bank including:

a plurality of cylinder retainer structures each for receiving and retaining an individual cylinder/power assembly, such retainer structures being symmetrically and uniformly spaced from a longitudinally central location of the elongated crankcase support structure;

(ii) unitary side wall means extending between longitudinal ends on each respective side of the crankcase, including:

(a) a test-valve portion, located above (b) an air box side wall portion, with each such air box side wall portion including a plurality of peripheral handhole openings distributed longitudinally along its respective side in the same symmetrical and uniformly spaced relationship as the cylinder head retainer structures;

(iii) structural framework extending longitudinally intermediate of and within the V-oriented pair of cylinder banks; such framework including:

(a) framework members defining a water discharge manifold disposed to extend longitudinally of the crankcase intermediate the V-oriented banks, at the open upper portion of such V-configuration between the cylinder banks, such water manifold means, including an exhaust deck, extends so as to present a longitudinally-central upper surface of the crankcase, (b) longitudinally extending internal framework members which contribute to defining such water discharge manifold and supporting such plurality of cylinder retainer structures along each such bank, with such internal framework members, including internal air box frame members for each such cylinder retainer structure, and (c) a power deck surface disposed along each such V-oriented bank in angled relationship to such exhaust deck, (iv) an exhaust passage from each such cylinder retainer structure extending through such water manifold means and defining an individual exhaust opening in such exhaust deck for each such cylinder, and (v) a transversely-oriented endplate disposed at, and unitary with, such crankcase side wall means and structural framework members at each longitudinal end of the elongated crankcase;

B. establishing, for reference purposes:

(i) a centrally-located horizontal reference axis extending between longitudinal ends of the elongated crankcase, (ii) a longitudinally-oriented vertical centerline plane of reference which includes such centrally-located axis, (iii) a transversely-oriented vertical plane of reference, intermediate such V-oriented cylinder banks, which is perpendicularly transverse to such centrally-located horizontal axis, and (iv) a preselected length within specified tolerance limits to provide for receiving an individual cylinder/power assembly in each such cylinder retainer structure in each bank, with each of such pair of cylinder banks being oriented to enable mounting and sealing of such individual cylinder/power assemblies in the individual cylinder retainer structures of each bank, with centrally-located axes for such cylinder assemblies in each respective bank being oriented downwardly in converging angled relationship toward the closed juncture of such V-type configuration;

C. cutting crankcase peripheral side wall access portions, including replaceable window portions cut from each air box side wall, each separated air box side wall window portion providing access to facilitate transversely-directed cutting of centrally located structural framework members for separation of each such transversely-oriented endplate, and D.
(i) cutting a replaceable exhaust deck portion and contiguous water jacket side wall, and (ii) cutting a contiguous upper portion of each endplate which is to be separated from the replaceable portion and discarded;

E. cutting crankcase framework members transversely of the elongated direction of the crankcase in a manner enabling separation of the remaining transversely-oriented endplate at each longitudinal end of the crankcase, with separation of such endplates exposing cut edges at each longitudinal distal end of the framework members and side wall means;

F. machining cut edges at each longitudinal distal end such that the machined edges define a substantially planar surface for receiving a planar replacement endplate of preselected thickness gage at each such distal end, such planar surface as machined being oriented in parallel relation to, or within preselected vertical and transverse tolerance limits of, to the transversely-oriented vertical reference plane;

G. verifying exhaust deck thickness within preselected thickness tolerance limits along its length while allowing for machining of its upper surface;

H. machining such exhaust deck to establish a substantially planar horizontal surface extending longitudinally between distal ends of the elongated crankcase and laterally to each angled power deck surface;

I. machining support surfaces for defining a power deck along each bank so as to provide:

a single planar longitudinally extending power deck surface for each bank for subsequent support of drive-associated components, including individually distinct support surfaces for camshaft bearing tower means, disposed along each bank contiguous to each lateral side of such exhaust deck, with such power deck machining being selectively carried out within preselected tolerance specifications and coordinated to present a planar power deck surface which, if extended laterally inwardly toward the centrally located reference plane, would intersect such reference plane at the same location forming the same included angle of sixty-seven and one-half degrees with such reference plane;

J. providing a new endplate of preselected thickness gage, free of bore openings for endplate-mounted drive-components, for each distal end of such structural framework, and welding each such new preselected thickness gage endplate to be unitary with its respective distal end of the crankcase framework;

K. establishing a camshaft location with respect to, and along, the power deck for each bank, each such camshaft location for a bank having its central axis parallel to such longitudinally-extending vertical centerline reference plane and being located in a vertically-oriented plane for each bank which is spaced equally a preselected distance horizontally from such central vertical reference plane, with quantitative downward displacement of such new camshaft axis being determined trigonometrically and based on such coordinated machining of the power deck surfaces; and L. establishing a new location for mounting a crankshaft, in relation to the locations established for such camshafts, in which the crankshaft centerline axis extends horizontally in the longitudinally-oriented vertical centerline reference plane, with such crankshaft centerline axis being located vertically where the angled plane of centerline axes for the cylinders of each bank intersect at a common location with such centrally-located reference plane to form an included angle of twenty-two and one-half degrees on each side of such reference plane.

2. The method of claim 1, in which such intersection of the plane of centerline cylinder axis for each bank relocates the crankshaft an amount corresponding to the vertical displacement for each camshaft relocation such that the dimensional and angular relationships between the crankshaft and each camshaft are unchanged by their respective relocations.

3. The method of claim 1, further including applying vibration stress-relief treatment at weld locations where welds were made as part of replacement of endplates, and return of access portions of the crankcase framework, with such vibration stress-relief being applied to each such weld and to contiguous framework areas of the crankcase.

4. The method of claim 3, including welding such access window portions in place at each longitudinal end of the air box for each bank, followed by vibration stress-relief treatment of such welds and contiguous surfaces of the air box for returning each such access window portion in-place.

5. The method of claim 4, further including applying a thermal stress-relief treatment to such crankcase with new endplates and access window portions welded in-place subsequent to such vibratory stress-relief treatment of the welds and contiguous areas of the crankcase framework.

6. The method of claim 5, further including vibration stress-relief treatment of accessible weld and contiguous areas of the crankcase framework subsequent to such thermal treatment.

7. The method of claim 5, in which such preselected thickness gage for each new endplate is between one inch and about one and one-half inches, with machining of such crankcase framework edges at each such respective longitudinal distal end being carried out within tolerance specifications of a planar surface, for receiving its respective new planar endplate, for each new endplate which is within about a half to about one degree, in vertical and/or transverse relationship, with respect to such transversely-oriented vertical plane of reference, and further including machining the exterior surface of each such new endplate, as welded in-place, such that each machined external surface is substantially parallel to such vertically-oriented transverse reference plane.

8. The method of claim 7, further including drilling and tapping openings, for endplate-supported drive-related assemblies, into each such new endplate, each such endplate opening being symmetrical with respect to its centerline axis, with each such opening centerline axis being horizontally-oriented to be parallel to the longitudinally-oriented vertical centerline plane of reference and to be perpendicularly-transverse to the transversely-oriented vertical plane of reference, and with each such opening being located to maintain its preselected angled and dimensional relationship between relocated crankshaft and camshaft.

9. The method of claim 5, further including machining the exterior transverse surface of each new preselected thickness gage crankcase endplate, so as to present a transverse plane in parallel relationship to such transversely-oriented vertical plane of reference at each such end, and so as to maintain a preselected longitudinal dimension for such crankcase, including such new endplates, which is within prescribed longitudinal dimension tolerance limits of plus or minus fifty mils.

10. The method of claim 8, further including welding bearing metal into main bearing "A" frames of the crankcase;

adjusting the length of removed crankshaft retainer cap legs so as to provide for a coaxial relationship with the crankshaft;

mounting such retainer caps in place on such main bearing "A" frames, and line-boring crankshaft bearing surfaces so as to provide for retaining the crankshaft coaxially of such bearing surfaces and locating in such longitudinally-oriented vertical centerline reference plane, with such centerline axis relocations of the crankshaft and camshafts enabling mounting of dimensionally and operationally standard cylinder/power assemblies along each bank of the V-type crankcase.

11. Method for in-place fabricating/machining of crankcase structure for a two-cycle V-type diesel electric locomotive engine to establish camshaft and crankshaft locations to provide for preselected orientation of, and locations for, endplate-supported motive-drive components, comprising the steps of:

A. providing an elongated unitary crankcase for a two-cycle V-type diesel electric locomotive engine free of all motive-drive associated components, all handhole covers, and oil pan structure; such unitary crankcase presenting:
 (i) a pair of V-oriented cylinder banks, each bank extending longitudinally along its respective left and right side of the elongated crankcase, with each bank including:
  a plurality of cylinder retainer structures, each for individually supporting a single cylinder/power assembly to provide a total of eight in each bank,
  such retainer structures being symmetrically and uniformly spaced from a longitudinally central portion of the elongated static support structure crankcase;
 (ii) side wall means on each respective side of the crankcase, including:
  (a) a test-valve side wall portion, located above
  (b) an air box peripheral side wall portion, with a plurality of peripheral handhole openings distributed longitudinally along each respective side;
 (iii) structural framework extending longitudinally of the crankcase and spanning spacing between the V-oriented pair of cylinder banks, such framework including:
  (a) framework members defining water discharge manifold means disposed to extend longitudinally of the crankcase between the V-oriented banks at the upper open portion of such V-configuration so as to transverse the spacing between such banks at such location, with
  an upper surface of such water manifold means presenting an exhaust deck extending longitudinally of the crankcase between the V-oriented banks,
  (b) longitudinally-extending internal framework members further defining such water discharge manifold and internal air box framing members supporting such cylinder retainer structures,
  (c) individually-separate support means for defining a power deck surface disposed along the upper portion of each such V-oriented bank in angled relationship to such exhaust deck,
  each such support means for defining the power deck being unitary with the crankcase framework, and
  (d) an exhaust passage from each such cylinder retainer structure extending through such water manifold and its upper exhaust deck surface defining an individual exhaust opening in such exhaust deck for each such cylinder of each bank; and with
 (iv) a transversely-oriented endplate of preselected thickness gage disposed at, and unitary with, such crankcase side wall means and structural framework members at each longitudinal end of the elongated crankcase;

B. establishing, for reference purposes:
 (i) a centrally-located horizontal reference axis extending between longitudinal ends of the elongated crankcase;
 (ii) a longitudinally-oriented vertical centerline plane of reference which includes such centrally-located axis;
 (iii) a transversely-oriented vertical plane of reference, intermediate such V-oriented cylinder banks, which is perpendicularly transverse to such centrally-located horizontal axis; and
 (iv) a preselected crankcase length within specified tolerance limits for mounting such a sixteen-cylinder V-type engine within a locomotive,
 each of such pair of cylinder banks being oriented to enable individually mounting and sealing each of such eight-cylinder liner/power assemblies in an individual cylinder retainer structure of each bank, with centrally-located axes of cylinders in each respective bank defining a longitudinally extending plane in converging angled relationship with the centrally-located plane of reference, so as to define an included angle of twenty-two and one-half degrees for each cylinder bank at a common location intersection of such converging angled planes with such centerline reference plane;

C. machining such upper surface of the exhaust deck to present a substantially planar horizontal surface, while maintaining a preselected thickness tolerance specification between about $\frac{5}{8}''$ and about $\frac{7}{8}''$ along such exhaust deck length;

D. uniformly machining such separate support means disposed along the upper portion of each bank so as to define:
 a single planar longitudinally-extending power deck surface for each bank for subsequent support of components, including camshaft bearing tower means disposed along each bank contiguous to each lateral side of such exhaust deck,
 such power deck machining being coordinated and uniformly carried out to locate such single planar power deck surface for each bank in a manner such that, if each such plane were extended in the direction of such centrally located reference plane, it would intersect such plane along the same horizontal line above such exhaust deck and define the same included angle on each side of such control reference plane;

E. establishing a camshaft location with respect to, and along, such defined power deck surface for each bank,
 each such camshaft location for a bank having its central axis parallel to such longitudinally-extending vertical centerline reference plane and being located in a vertical plane for each bank which is equally spaced horizontally, and parallel to, such vertical reference plane establishing a location for the centerline axis of the camshaft in such vertical plane which is equally spaced above the planar power deck surface for each bank at a location for activating power assembly means positioned in each cylinder retainer means substantially equidistant along each such cylinder axis from such centrally located vertical reference plane;

F. establishing a location for mounting a crankshaft in relation to such crankcase with the centerline axis for such crankshaft extended horizontally in the longitudinally-oriented vertical centerline reference plane, and being located vertically at the intersection of each such angled plane formed by centerline axes for cylinders in each bank which defines the same included angle of twenty-two and one-half degrees for each bank on each side of the centrally-located reference plane, and G. machining the exterior surface of each preselected thickness gage crankcase endplate, so as to present an exterior surface in a transverse plane for each endplate which is in parallel relationship to such transversely-oriented vertical plane of reference.

12. The method of claim 11, further including drilling and tapping openings into each such preselected thickness gage endplate for endplate-supported motive-drive assemblies, each such opening being symmetrical with respect to its centerline axis, with each such opening centerline axis being horizontally-oriented to be parallel to the longitudinally-oriented vertical centerline plane of reference and to be perpendicularly-transverse to the transversely-oriented vertical plane of reference, and being predeterminedly located based on the angled and dimensional standard relationship between crankshaft and camshafts established by respective locations.

* * * * *